(12) United States Patent
Villinger

(10) Patent No.: US 6,651,934 B2
(45) Date of Patent: Nov. 25, 2003

(54) RESCUE SYSTEM FOR RESCUING PERSONS BY AIR

(76) Inventor: Markus Villinger, Gagers 45, A-6165 Telfes (AT)

(*) Notice: Subject to any disclaimer, the term of this patent is extended or adjusted under 35 U.S.C. 154(b) by 0 days.

(21) Appl. No.: 10/291,442

(22) Filed: Nov. 8, 2002

(65) Prior Publication Data

US 2003/0106965 A1 Jun. 12, 2003

(51) Int. Cl.⁷ .............................................. B64D 17/00
(52) U.S. Cl. ..................... 244/142; 244/147; 244/148; 244/902; 182/48; 182/3
(58) Field of Search ................. 244/142, 147, 244/148, 138 R, 902, 146; 182/48, 3

(56) References Cited

U.S. PATENT DOCUMENTS

| 3,921,944 | A | * | 11/1975 | Morrison | 244/138 R |
| 5,029,777 | A | * | 7/1991 | Le Blanc et al. | 244/151 R |
| 5,058,831 | A | * | 10/1991 | Takahashi | 244/142 |
| 5,253,826 | A | * | 10/1993 | Coltman et al. | 244/147 |
| 5,388,786 | A | | 2/1995 | Hirose | 244/138 |
| 5,544,846 | A | * | 8/1996 | Stroud | 244/147 |
| 6,213,429 | B1 | * | 4/2001 | Chu | 244/140 |

* cited by examiner

*Primary Examiner*—J. Woodrow Eldred
(74) *Attorney, Agent, or Firm*—Laurence A. Greenberg; Werner H. Stemer; Ralph E. Locher

(57) ABSTRACT

A rescue system for rescuing persons by air, particularly from tall buildings or airplanes, has a receptacle with at least one parachute or paraglider. A harness for the parachute or paraglider is connected to the receptacle. The receptacle is constructed as a closable package with a substantially cuboid or suitcase-like shape and also has an opening mechanism. The harness for the parachute or paraglider is disposed inside the closed receptacle.

10 Claims, 2 Drawing Sheets

RESCUE SYSTEM FOR RESCUING PERSONS BY AIR

BACKGROUND OF THE INVENTION

FIELD OF THE INVENTION

The invention relates to a rescue system for rescuing persons by air, particularly from tall buildings or airplanes, comprising a receptacle wherein at least one parachute or paraglider is arranged, and a harness for the parachute or paraglider which is connected to the receptacle.

A device of this general type is described in U.S. Pat. No. 5,388,786. In this type of device, a round chute is stored in a case with the harness hanging out of the suitcase. It has proven to be disadvantageous that in the event that it is needed, owing to the prevailing panic, the harnesses hanging out of the suitcase often become tangled, so that the rescue unit is either no longer usable at all, or it takes so much time to put on the rescue unit that it is impossible to make a fast escape.

SUMMARY OF THE INVENTION

It is accordingly an object of the invention to provide a rescue system, which overcomes the above-mentioned disadvantages of the heretofore-known devices and methods of this general type and which is dependable and facilitates a fast and safe escape by the user.

With the foregoing and other objects in view there is provided, in accordance with the invention, a rescue system for rescuing persons by air, comprising:

- a receptacle formed as a closable package having a substantially cuboid or suitcase-type shape and having an opening mechanism for opening the receptacle;
- at least one flying device selected from the group consisting of a parachute and a paraglider disposed in the package; and
- a harness attached to the flying device and disposed inside the receptacle when the package is closed.

With the above and other objects in view there is also provided, in accordance with the invention, a rescue device, comprising a receptacle formed as an airbag and containing a flying device selected from the group consisting of a parachute and a paraglider, and a harness for the flying device fixed to the receptacle.

In other words, the objects of the invention are achieved by constructing the receptacle as a closable, substantially cuboid or suitcase-shaped package with an opening device for the receptacle, whereby the harness for the parachute or paraglider is disposed inside the closed receptacle. Disposing the harness for the parachute or paraglider inside the closed receptacle prevents the harness for one parachute or paraglider from getting tangled with a harness of one of the other rescue systems during storage. Furthermore, the suitcase-shaped package makes it possible to store the rescue system efficiently.

According to another embodiment, the opening device is constructed as a quick-open device, it being possible for the user to put on the harness for the parachute or paraglider together with the receptacle without any further manipulation after the actuation of the opening mechanism. This particularly user-friendly variant guarantees that the rescue system is quickly available and prevents possible errors in putting on the rescue system almost entirely. The user need only activate the opening mechanism, whereupon the receptacle folds open and releases the harness for the parachute or paraglider. It has proven particularly advantageous when the opening mechanism is disposed at a breaking point and/or at opening straps of the receptacle.

According to another embodiment of the inventive rescue system, in order to guarantee that the parachute or paraglider opens even in jumps at low altitude, the parachute is a controllable quick-opener, for instance a delta chute.

In accordance with another exemplary embodiment, in order to prevent possible sources of error for the usually inexperienced user, the parachute or paraglider is furnished with what is known as an "automatic opening system", wherein the parachute or paraglider is provided with a rip cord with a rip hook at the end, whereby it has proven particularly safe when at least the end of the rip cord with the hook protrudes from the closed receptacle for purposes of securing it at part of a building or airplane in a detachable or permanent fashion. The rescue systems can thus be efficiently stored next to one another packed into one unit in a favorable jump-off location, and by hanging the hooks on a fixed part of a building such as a steel cable, the rescue systems can already be made ready for use.

Alternatively, it can be provided that the opening process is initiated by means of a "hand deploy." The opening of the parachute or paraglider is then triggered by means of a small auxiliary chute.

According to a variant of the inventive rescue system, the receptacle for a parachute or paraglider with a preferably permanently attached harness can comprise an airbag, preferably in the form of a seat, whereby it has also proven particularly advantageous when the airbag is constructed in at least two parts, with a first part disposed in the area of the user's back and buttocks, and a second part arranged in the chest and stomach area. Experience has shown that one of the biggest problems that unpracticed users have in parachuting or paragliding is the landing. Arranging an airbag in the area of the back and buttocks and in the area of the chest and stomach guarantees the near total prevention of injuries as a result of landing hard or landing on an obstacle such as a car, traffic sign, and so on.

Provided that the invention is not subject to any limitation with respect to how the airbag is inflated, it has proven expedient with respect to achieving a simple construction when the airbag is filled by means either of compressed air or ram air.

In accordance with a further feature of the invention, which is particularly simple in terms of handling, the harness for the parachute or paraglider is fixed to the receptacle, and the receptacle is provided as a closable package with a quick-open mechanism, whereby the parachute or paraglider is disposed inside the closed receptacle and connected to a rip cord with a hook attached to it, whereby at least the end of the rip cord with the hook protrudes from the closed receptacle for purposes of securing it to part of a building or airplane in a detachable or permanent fashion. A space-efficient rescue system is thereby achieved, with which a fast and safe rescuing of persons by air is provided, and which allows an injury-free landing.

Other features which are considered as characteristic for the invention are set forth in the appended claims.

Although the invention is illustrated and described herein as embodied in a rescue system for rescuing persons by air, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
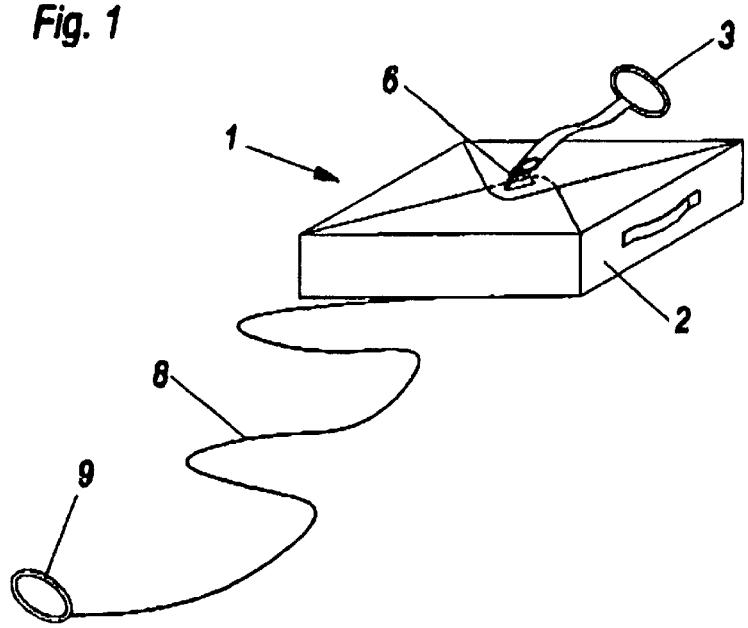
FIG. 1 is a perspective view of the novel rescue system according to the invention as a closed package.
Figure 2:
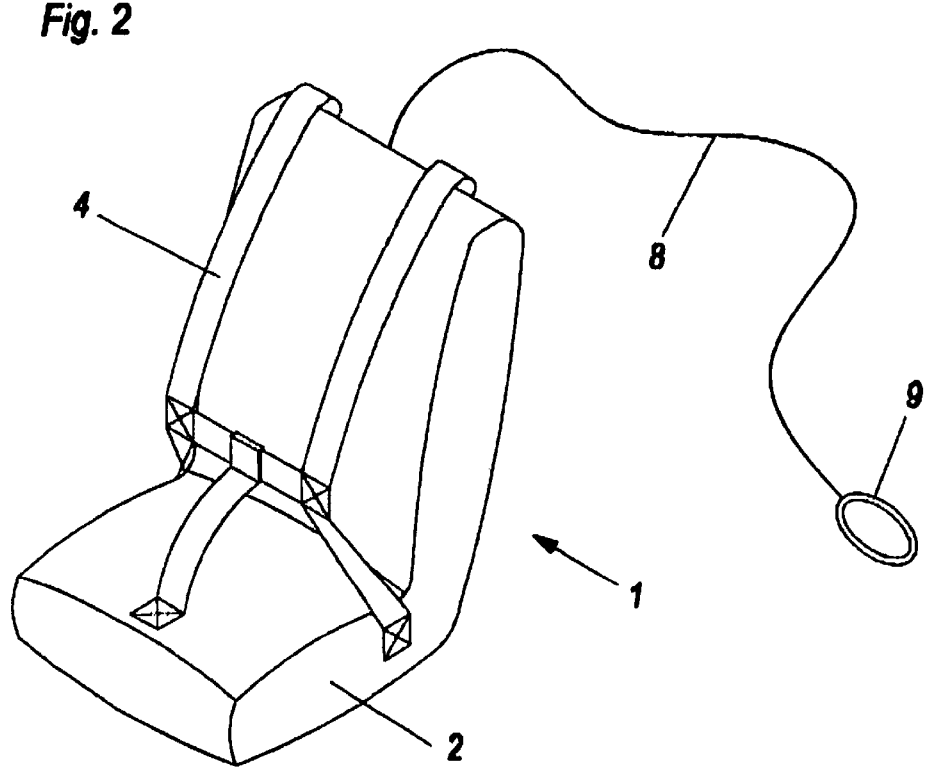
FIG. 2 is a perspective view of the rescue system of FIG. 1 shown as an opened package.

Referring now to the figures of the drawing in detail and first, particularly, to FIG. 1 thereof, there is shown a rescue system 1 that comprises a container or receptacle 2, which represents a closed package. A quick-open mechanism 3 is disposed at a breaking point 6 or at opening straps of the receptacle 2. The rip cord 8 with a ring or hook 9 at its end protrudes from the receptacle 2. The rip hook 9 can already be attached to part of a building during storage. But it is also possible for the user to fix the hook to a suitable part of a building only in the event of use. When the quick-open mechanism 3 is at that point actuated, the receptacle 2 unfolds as represented in FIG. 2. The harness 4 for the parachute or paraglider which is disposed inside the previously closed package and which is fixed to the receptacle 2 comes free and can be put on easily by the user. The parachute or paraglider can also be opened during flight with what is known as a hand deploy instead of an "automatic opening system." The parachute and the paraglider or equivalent devices are generically referred to flying devices herein.

Figure 3:
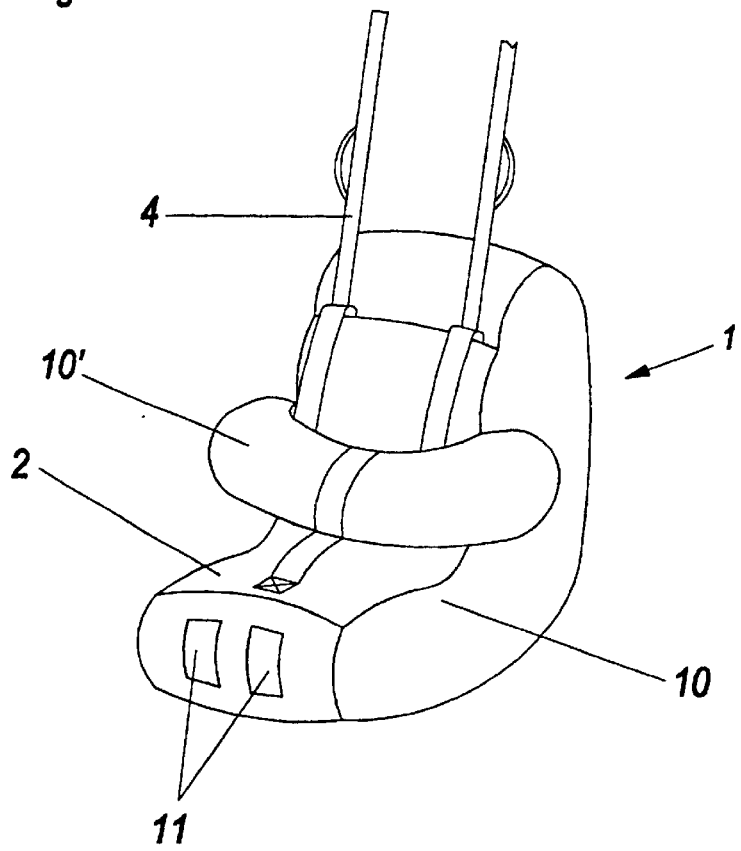
FIG. 3 is a perspective view of a rescue device with an airbag.

Referring now to FIG. 3, the receptacle 2, which has the shape of a seat, can also comprise an airbag 10,10', whereby it makes possible a safe and injury-free landing. On the side of the receptacle 2 which is averted from the user 5 is an airbag 10 which protects the back and buttocks area of the user 5. But given forward travel of the parachute or paraglider 7, a user 5 would unavoidably hit the ground with her front side during landing. In order to prevent this, an additional airbag 10' is disposed in the chest and stomach area of the user 5, whereby the airbag 10,10' in the illustrated exemplifying embodiment comprises openings 11, 11' via which it is filled by means of ram air. Of course, the airbags 10, 10' can also be inflated with compressed air.

Figure 4:
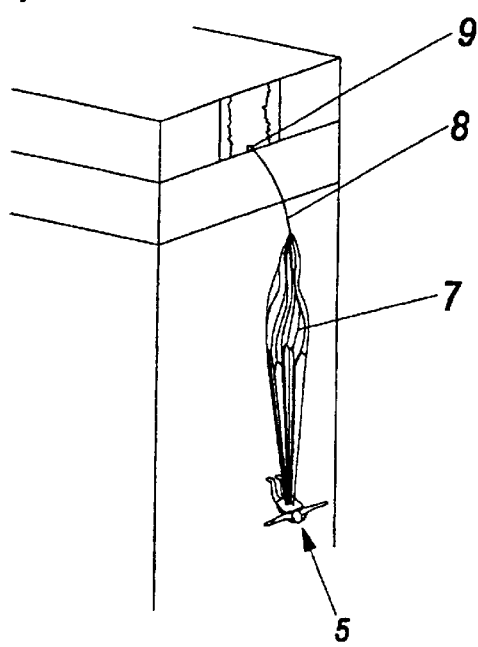
FIG. 4 is a perspective view illustrating a rescue operation out of a tall building and showing the opening process of a parachute or paraglider with an automatic opening system.
Figure 5:
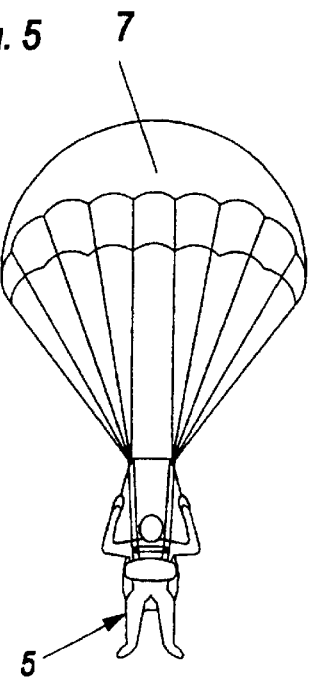
FIG. 5 is a schematic elevational view showing a user during the flight phase.

FIG. 4 represents the opening process of an "automatic chute" 7. The rip hook 9 is permanently connected to part of a building, for instance a steel cable or hook. The parachute or paraglider 7 which is connected to the rip hook 9 via the rip cord 8 is ripped from the receptacle and opens, so that, as represented in FIG. 5, the user 6 floats slowly and safely to the ground with the aid of the open and controllable parachute or paraglider, where her fall is broken by the airbags 10, 10' in the receptacle 2.

While the inventive rescue system has been described in connection with the exemplary embodiments, it is not limited to these. Rather, it goes without saying that measures and modifications which serve for transforming the inventive idea are entirely imaginable and desirable. For example, instead of an "automatic chute", a "self-activator" can be used (i.e. the chute opening process is initiated by the user). Also, arranging an airbag directly at a harness for a parachute or paraglider is also entirely possible.

What is claimed is:

1. A rescue system for rescuing persons by air, comprising:
   a receptacle formed as a closable package having a substantially cuboid shape and having an opening mechanism for opening said receptacle;
   at least one flying device selected from the group consisting of a parachute and a paraglider disposed in said package; and
   a harness attached to said flying device and disposed inside said receptacle when said package is closed.

2. The rescue system according to claim 1, wherein said opening mechanism is a quick-open mechanism and wherein, upon actuation of said opening mechanism, said harness for said flying device becomes available to be worn by a user together with said receptacle substantially without further manipulation.

3. The rescue system according to claim 1, wherein said receptacle is formed with a breaking point and said opening mechanism is disposed at said breaking point.

4. The rescue system according to claim 1, wherein said receptacle is formed with opening straps and said opening mechanism is disposed at said opening straps.

5. The rescue system according to claim 1, wherein said flying device is a fast-opening parachute.

6. The rescue system according to claim 1, wherein said flying device is a fast-opening paraglider.

7. The rescue system according to claim 1, wherein said flying device comprises a rip cord with a hook attached to an end thereof.

8. The rescue system according to claim 7, wherein at least the end of said rip cord with said hook protrudes from said package when said receptacle is closed, to enable said rip cord to be detachably or permanently secured to a building or an airplane.

9. In combination with a building, a rescue system according to claim 1 strategically placed in the building to enable the rescue of persons from the building through the air.

10. In combination with an airplane, a rescue system according to claim 1 disposed in the airplane to enable the rescue of persons from the airplane by parachuting or paragliding from the airplane.

* * * * *